United States Patent
Loewen et al.

(10) Patent No.: US 7,184,072 B1
(45) Date of Patent: Feb. 27, 2007

(54) AIRBORNE INVENTORY AND INSPECTION SYSTEM AND APPARATUS

(75) Inventors: John Loewen, Iron Mountain, MI (US); Mark Reimer, Victoria (CA)

(73) Assignee: Power View Company, L.L.C., Milwaukee, WI (US)

( * ) Notice: Subject to any disclaimer, the term of this patent is extended or adjusted under 35 U.S.C. 154(b) by 346 days.

(21) Appl. No.: 10/236,837

(22) Filed: Sep. 6, 2002
(Under 37 CFR 1.47)

Related U.S. Application Data (63) Continuation of application No. 10/072,312, filed on Feb. 8, 2002, which is a continuation of application No. 09/883,103, filed on Jun. 15, 2001.

(60) Provisional application No. 60/211,742, filed on Jun. 15, 2000.

(51) Int. Cl.
*H04N 7/18* (2006.01)

(52) U.S. Cl. .................. 348/144; 348/143; 348/140; 348/141; 348/142; 701/3; 701/4; 382/106

(58) Field of Classification Search ............ 348/144, 348/143, 140, 141, 142; 701/3, 4; 382/106
See application file for complete search history.

(56) References Cited

U.S. PATENT DOCUMENTS

| | | | | |
|---|---|---|---|---|
| 5,557,397 A | * | 9/1996 | Hyde et al. ............. | 356/5.01 |
| 6,766,226 B2 | * | 7/2004 | Andersen ................ | 701/3 |

* cited by examiner

Primary Examiner—Shawn S. An

(57) ABSTRACT

A system and apparatus for acquiring images of electric transmission line tower structures, equipment attached to said tower structures, and transmission lines suspended from said towers. The system uses a fixed wing aircraft and an arrangement of at least one still camera, means for detecting a tower structure, a data storage unit, and a central processing unit containing operational software. The central processing unit is connected to the camera, the means for detecting a tower structure, and the storage unit. The detection means is a laser altimeter or a combination of preset longitude/latitude coordinates for tower locations and a GPS unit which supplies continuous longitude/latitude coordinates for the aircraft location for comparison to those preset coordinates. The aircraft is flown along the transmission line at a predetermined altitude above the tops of said towers (60–100 feet). The still camera points rearwardly relative to the line of flight of the aircraft and take a picture from between two adjacent towers and along an exposure line directed downwardly at an angle to the line of flight, 30–60 degrees and preferably 45 degrees. The detecting means transmits a signal to the central processing indicative of the presence of a tower to be photographed. The central processing unit calculates the time delay necessary for said aircraft to fly past the tower to a predetermined exposure point located between the tower to be photographed and the next tower in said transmission line after the tower to be photographed. The still camera is activated at the exposure point to acquire an image of the tower structure. The data corresponding to the acquired image is transmitted to a data storage unit for later retrieval and examination to identify defects in the tower or the equipment or transmission lines suspended form the tower. The system is reset to continue acquiring images along the transmission lines. The system is also provided with a video capability to film the towers and transmission lines and the line right-of-way.

38 Claims, 7 Drawing Sheets

AIRBORNE INVENTORY AND INSPECTION SYSTEM AND APPARATUS

CROSS REFERENCE TO RELATED APPLICATIONS

This application is a continuation of U.S. application Ser. No. 10/072,312, filed Feb. 8, 2002, which is a continuation of application Ser. No. 09/883,103, filed Jun. 15, 2001 and claims the benefit of the filing date of earlier filed provisional Application Ser. No. 60/211,742 filed Jun. 15, 2000 and entitled "Airborne Inventory and Inspection System."

TECHNICAL FIELD

This invention relates to an airborne inventory and inspection system designed to obtain high resolution images of electric transmission power lines, the power line right-of-way and the support structure towers, along with a record of the respective location of the power line towers, which system is an improvement over current accepted systems and can be performed at a cost that makes use of this system more cost effective than alternatives available to the electrical power transmission industry.

BACKGROUND OF THE INVENTION

The electrical power industry has a recognized need to periodically inspect both the right-of-way for electric transmission lines and the tower structures and related equipment supporting the transmission lines along the right-of-way.

Currently accepted systems utilize walking/driving patrols combined with climbing the towers or the use of bucket trucks to inspect the towers and the equipment on the towers. Another accepted method of inspection is the use of rotary wing aircraft (helicopters) to fly by and hover at the towers to inspect the towers and equipment. Another possible method uses fixed wing aircraft and expensive custom designed electronic equipment to perform this service from high altitudes, e.g., heights of 1,500 to 6,000 above the towers and have used expensive cameras, custom designed electronic equipment to control the cameras, and sophisticated stabilization equipment to support the cameras. All of these accepted methods contemplate acquiring a photographic record of the tower and tower supported equipment for inspection, and archiving in a database, e.g., an asset management database.

The basic objective of inspecting the power lines, the right-of-way and the towers and tower supported equipment is to detect problems in the right-of-way and defects in the equipment supported on the towers and used in conjunction with the transmission power lines, e.g. insulators, hardware and the like, and the lines themselves at the tower structure.

The problems with these accepted methods is quality of the images, the data acquired, and the cost attendant all of the methods and particularly those that provide the more reliable data. Cost is usually measured in cost per mile of line inspection. High altitude and fixed wing systems are not feasible both from the standpoint of cost and the quality of the images obtained, at least in the acquisition of images of the tower structure per se and the tower supported equipment. The other alternatives in part predated the high altitude systems and were and continue to be accepted as the best currently available and workable alternatives to high altitude systems but have their own shortcomings. More particularly, walk/drive and climb have the potential to provide the most reliable and useable data but has the highest cost. Helicopter inspection is more cost effective than walk/drive and climb but still involves a relatively high cost. Helicopter inspection relies on multiple member crews, flying between and hovering at the towers to visually inspect the structure and equipment and obtaining a film record if a defect is detected. Helicopter inspection offers a better cost structure than walk/drive and climb but involves substantial time in acquiring the images and sacrifices some of the quality of results that can be obtained with walk/drive and climb.

One of the objectives of this invention is to provide reliable and accurate images of the tower structures of an electric transmission line and related equipment supported on those tower structures which can be used to detect defects in the tower structure itself, the equipment supported on the tower structure, as well as the transmission lines as they are connected at the towers, and to do so in a cost effective manner.

Another objective of this invention is to provide a reliable and accurate record of the right-of-way of an electric transmission line, and to do so in a cost-effective manner.

More broadly, it is among the objectives of this invention to provide aerial images of ground structures, apparatus, roadways and the like in an accurate, reliable and cost-effective manner.

SUMMARY OF THE INVENTION

For the achievement of these and other objects, this invention proposes a system utilizing a fixed wing aircraft which is flown in close proximity to the towers to enable an arrangement of still, digital cameras on the aircraft to capture high resolution images of the electric transmission line tower structures and equipment attached to those towers. Although this discussion will refer to the use of plural cameras, it will be appreciated that this invention contemplates the use of one or more still cameras.

In accordance with this invention, the still cameras take pictures of the towers from an exposure point between two adjacent towers and along an exposure line that is at a shallow angle to the horizontal. The horizontal is defined in terms of the desired line of flight of the aircraft; the line of flight being generally parallel to the terrain over which the transmission lines are strung and over which the aircraft is flying. The still cameras point rearwardly relative to the line of flight and are arranged to take pictures along an exposure line that is at an angle of substantially 30–60 degrees to the horizontal, preferably 45 degrees.

More specifically, the aircraft is flown along the transmission line at a low altitude, preferably 60–100 feet above the tops of the tower structures. The aircraft speed is in the range of 80–100 miles per hour. That altitude and speed allow the use of advantagous exposure parameters (shutter speed, lens opening and resulting depth of field) for the cameras such as to result in capturing the high quality, still, high resolution images. Also, at that speed, sufficient time is available for the transfer of imaging data from the cameras to storage and for resetting the cameras to capture images of the next, upcoming tower. Placing the exposure point for the still cameras between the adjacent towers and at the shallow angle to the horizontal produces high-resolution images; flying at the above-described altitude contributes to the high-resolution imagery. The exposure point, angle of the line on which the still cameras take the pictures, and the altitude of the aircraft are all factors in insuring that images of at least the upper portion of the tower carrying the transmission lines, the electric insulators, and hardware are properly framed in the picture.

The still cameras exposure is automated by including in the system a capability for detecting a tower structure and an onboard computer (a central processing unit) containing operational software and operatively connected to the cameras and the tower detecting device. The still cameras, computer, and detection capability are operationally interconnected to automatically activate the still cameras at the exposure points along the transmission line.

In one embodiment, the tower detecting device is in the form of a laser altimeter. In an alternative embodiment, the system also contemplates the use of a GPS capability which cooperates in detecting the presence of a tower structure that is to be photographed.

In accordance with a further aspect of this invention, the system includes one or more digital video cameras. The video cameras are capable of operation in a continuous mode of image capture as the aircraft flies over the transmission line to record the right-of-way. That continuous mode of operation can be at various frames per second as desired.

Preferably, one video camera is arranged to take pictures along an exposure line which is at an angle of substantially 90 degrees to the horizontal and directed downwardly relative to the aircraft line of flight, the horizontal being as defined above. This is to record the right-of-way of the transmission line. A second video camera is preferably arranged on the aircraft to point forward and downward to take a film of the right-of-way as well. Preferably, the second video camera is arranged at the same angle to the horizontal as described above in connection with the still cameras. This second video camera can be used as a continuous sighting camera for the pilot to allow him to monitor the flight path of the aircraft over the right-of-way, or to supplement data acquired by the first mentioned video camera.

The GPS, in combination with the onboard computer, continuously provides the position of the aircraft in longitude and latitude coordinates. In accordance with this system, that data is transmitted to the onboard computer and, in accordance with another aspect of this system, is embedded in the collected data in association with the image of a particular tower structure so that the geographic location of the tower is associated with the image of that tower. This recording of the tower location in longitude/latitude coordinates in association with the image of each tower provides an inventory database of all of the towers along a particular transmission line. The embedding of geographical location can be done in association with images captured by both the still and video cameras.

The still and video images, along with the geographic coordinates are transmitted to data storage units on board the aircraft for post processing or other future use as desired. For example, post processing can be visual inspection, tower by tower, on a suitable monitor for detection of structural defects.

In operation, the presence of a tower structure is detected and an appropriate signal based on that detection is transmitted to a control, preferably the onboard computer, and the control activates the still cameras to capture the image of that particular tower. This detection is accomplished either with the use of information from a database containing the longitude/latitude coordinates of the towers, which have been preloaded into the onboard computer, or with the use of a detection unit that actually senses the presence of the towers as the aircraft flies over the transmission lines.

When the alternative of preloaded longitude/latitude coordinates is used, the GPS unit is used in the activation of the still cameras. More particularly, the GPS continuously transmits longitude/latitude coordinates to the computer and the computer determines, from the preloaded coordinate information, the longitude and latitude coordinates of the next or approaching tower and the distance to the next tower and to the next still camera exposure point. The computer then calculates the time delay, taking into account the ground speed of the aircraft, until the aircraft arrives at the exposure point where the still cameras are to be operated to capture the image. While this is taking place, the system is reset to capture the images of the next tower.

In the embodiment which incorporates a laser altimeter, a signal is generated by the laser altimeter when it detects the presence of a tower. That signal is transmitted to the computer and the computer goes through the same type of calculation as described above to activate the still cameras at the exposure point and to reset the system for the next tower. In this embodiment the computer determines the distance from the detected tower, which is the one to be photographed, to the exposure point for that tower.

In either embodiment, a signal is generated as the aircraft is approaching and flying over a particular tower by either of the mentioned alternatives, with that signal being transmitted to the onboard computer. The onboard computer, based on the ground speed of the aircraft, determines the time necessary for the aircraft to fly from the point of receiving the signal past the detected tower a distance corresponding to the exposure point relative to the tower.

The data generated by the still cameras is transmitted, in digital form, to a data storage system on board the aircraft where it is stored for later retrieval and post processing as desired.

The system can also incorporate displays in the aircraft cockpit to allow the pilot to monitor the line of flight of the aircraft relative to the right-of-way and/or to monitor the state of operation of the image capture portion of the system. In addition, a flash assembly can be used to enhance the photos being taken.

Other objectives and advantages of this invention will be pointed out, or become apparent from, the following description and claims, as will obvious modifications of the embodiments shown in the drawings in which:

DESCRIPTION OF THE DRAWINGS

FIG. 7 is a view of the instrument panel and windshield of the aircraft as viewed from the interior of the cockpit of the aircraft;

DESCRIPTION OF THE PREFERRED EMBODIMENT

Figure 1:
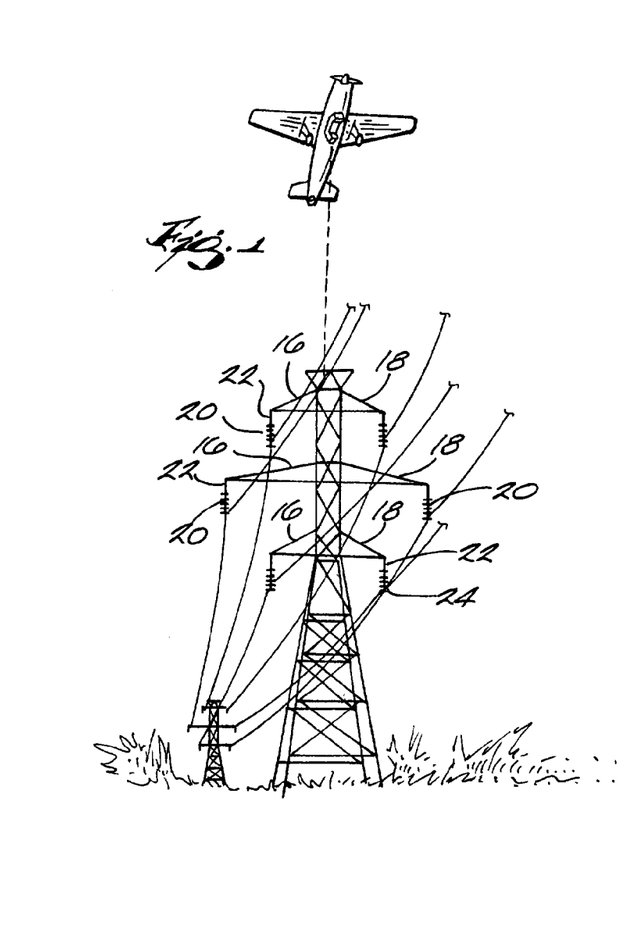
FIG. 1 is a generally schematic, perspective view of an aircraft flying over a transmission line in accordance with this invention.
Figure 4:
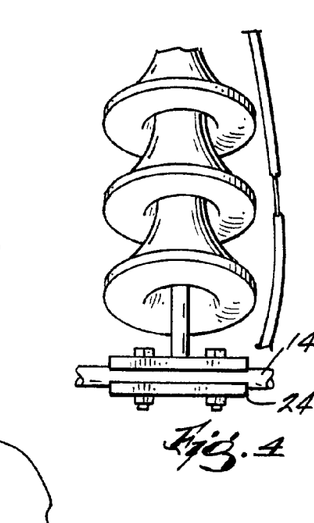
FIG. 4 is an enlarged view, generally schematic, illustrating an electrical insulator and hardware connecting the electrical to insulator and the tower.

Electrical power is conveyed over transmission lines between power generating plants, field stations, states and the like. In their most basic configuration, these systems include towers 10, which in major part are uniformly spaced along the terrain 12 a desired distance, for example, two-tenths of a mile apart. Transmission cables or lines 14 are strung between the towers and suspended above the terrain. The towers can be of various heights as measured from the surface of the terrain, for example from 80–120 feet high. Transmission cables are supported at the tower structures by a combination of a laterally extending arm, or arms, 16 and 18. Insulators 20 are connected to the arms 16 and 18 with associated hardware 22 and 24. The transmission cables are anchored at the towers, specifically at the insulators, by the hardware 22 and 24 and the insulators maintain the necessary spacing between cables to ensure electrical isolation. The insulators and related hardware connections are conventional and will not be shown in any greater detail.

This is an example of a typical transmission line tower structure. There are other conventional tower and cable support systems that can be used depending upon the application and this invention is not necessarily limited to any specific tower structure or cable support system.

In this manner, the transmission cables are strung along the countryside and the path defined by the tower structures and the cables is commonly referred to as a "right-of-way."

To maintain the integrity and serviceability of the transmission system, it is necessary periodically to inspect that system for defects in equipment, for example, corroded insulators, defective hardware, frayed transmission cables, and the like. It is also required to inspect the integrity of the right-of-way periodically to determine, for example, if things such as trees and other plant growth or the like have encroached into the right-of-way and is presenting a potential interference with the transmission lines.

Figure 2:
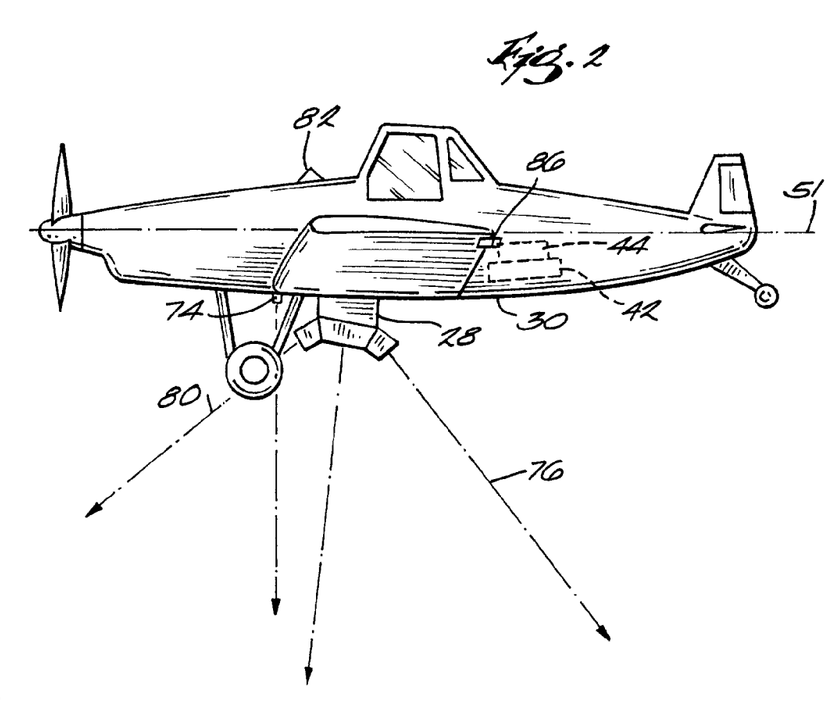
FIG. 2 is a generally schematic view of an aircraft incorporating the system of this invention.

To that end and in accordance with this invention, a fixed wing aircraft 26 is equipped with a data collection system. In the preferred embodiment of this invention, the fixed wing aircraft is a Piper Pawnee of the type commonly used in crop dusting applications. The data collection system includes a pod 28 fixed to the underside 31 of the aircraft fuselage generally in the area which would coincide with the center of gravity of the aircraft. Locating the pod in the area of the center of gravity minimizes the error in the data collection system that can occur due to movement of the aircraft from the preferred line of flight, as will be described and/or become evident from the description to follow.

The use of the Piper Pawnee is desirable, as it is capable of consistent and reliable flight at the low altitude and low speeds of the system of this invention. For example, the aircraft can fly continuously over the tower structures at a ground speed and altitude preferred in this invention, namely approximately 80–100 miles per hour and an altitude of 80–100 feet above the tops of the tower structures.

Figure 5:
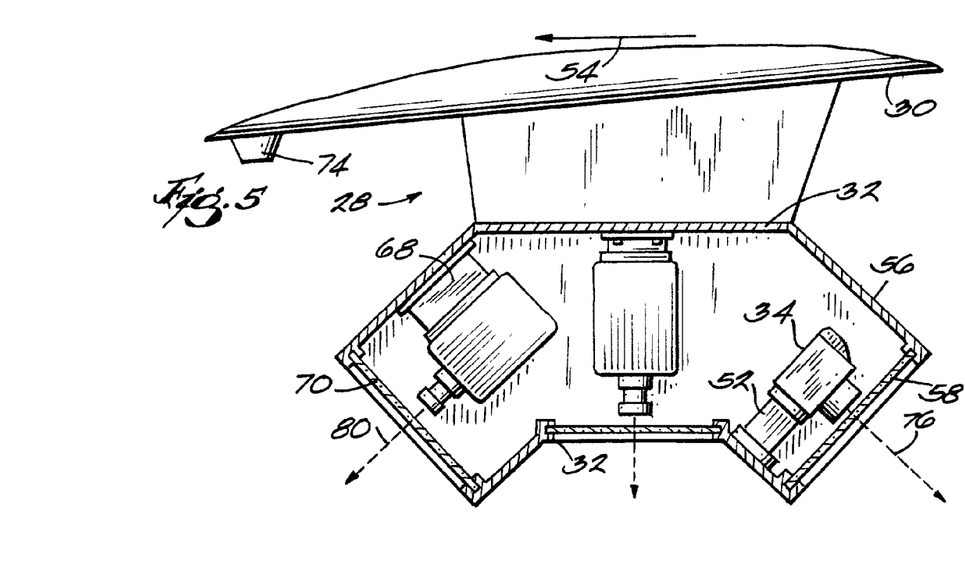
FIG. 5 is partial view of the aircraft fuselage and the pod attached to the fuselage with the interior of pod exposed to show the cameras.
Figure 6:
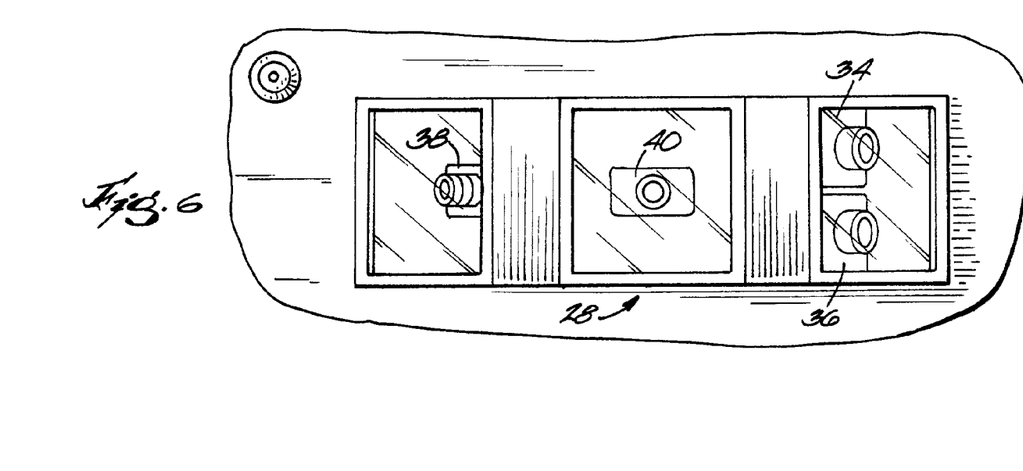
FIG. 6 is a bottom view of the pod and cameras.

The data collection system pod includes a number of cameras supported in a protective outer housing 32 to collect images of the tower structures, the equipment supported on the tower structures and the transmission cables themselves, as well as images of the right-of-way. The number and arrangement of the cameras can vary, but preferably two digital still cameras 34 and 36 and two digital video cameras 38 and 40 are mounted within the housing.

The type of video cameras used can vary but preferably are Canon Optura Mini DV cameras which operate in a progressive scan mode which produces continuous exposure, and relatively clear still images that can be used if desired in post process viewing. The video cameras are arranged so that one 38 looks forward and a second camera 40 looks down. The video cameras are remotely operated in a conventional manner, e.g., by their Lane control connection. VITC (Vertical Interval Time Code) time code signals are derived from the video cameras and sent to a central processing unit and onboard computer 42 for recording along with image data. The VITC signals assign a unique number to each video frame (still picture) having the format Hours:Minutes:Seconds:Frames. The video camera system is also configured to permit remote viewing in the cockpit area 44 on a flat panel LCD (liquid crystal display) screen 46, or merely with a tally/record light 48 to advise the pilot of the operational state of the video cameras. That is, when the light is on the cameras are filming. The image is available to the pilot at a glance and is illustrated schematically at 50. This allows the pilot to conveniently and safely monitor the fly over without substantially diverting his attention to his main task of maintaining the desired line of flight. Again, this equipment and its respective connections in the system are conventional and therefore neither the equipment nor the connections are illustrated nor described in detail.

The digital still cameras are supported in the pod by a bracket system 52 with the cameras facing rearward, that is rearward in the reference to the direction or line of flight of the aircraft. Arrow 54 in FIG. 5 illustrates the direction of flight. The cameras look through a short tunnel section 56 of the pod housing. The end of the tunnel section is preferable covered by glass panel 58 to prevent intrusion of moisture, dirt, bugs and the like into the pod and impingement on the camera and/or camera lenses. The still cameras are preferably Kodak DCS-560 digital still cameras. These cameras produce digital still images at resolutions of over 2000 by 3000 pixels. These cameras capture images at the rate of 1 image per 4.5 seconds and are used to capture images of the tower structures 10 at their particular locations. The still cameras write their information to a removable hard drive (conventional and therefore not shown in detail) incorporated and operatively associated with the onboard computer 42 and data storage units 44, but the cameras could write their information directly to the onboard computer via a well known and conventional firewire connection. To properly fire the still cameras, the computer must pre-arm the camera prior to tripping the shutters to eliminate inconsistent trip delay times. This is preferably preformed ½ second prior to the actual trip. As will be described more completely hereinafter, the actual trip time is calculated either by using a GPS location and known structure locations, or by using a laser altimeter.

The two video cameras are mounted in the housing. Camera 40 is supported by a bracket system 60 over the central, relatively flat section 62 of the housing 32 (that is flat as compared to the angle of the channel 56 through which the still cameras look). The flat section is covered by a panel of glass 64 for the same reasons as described above.

The second video camera 38 is mounted in a second channel 66 of the housing which is the same in shape and orientation (relative to the line of flight) as the first channel 56. Video camera 38 is supported by a bracket system 68 and looks forwardly through the channel 66 and a covering glass panel 70.

Although the system is being described in connection with cameras that point forwardly as well as rearward, it should be noted that the forward orientation does have some drawbacks in the sense that the glass cover piece is susceptible to bug strikes and contamination by other airborne particles (for example, exhaust and the like which might come from the aircraft engine) so that it is desirable to have the cameras oriented, particularly the still cameras, in a rearward direction.

Figure 8:
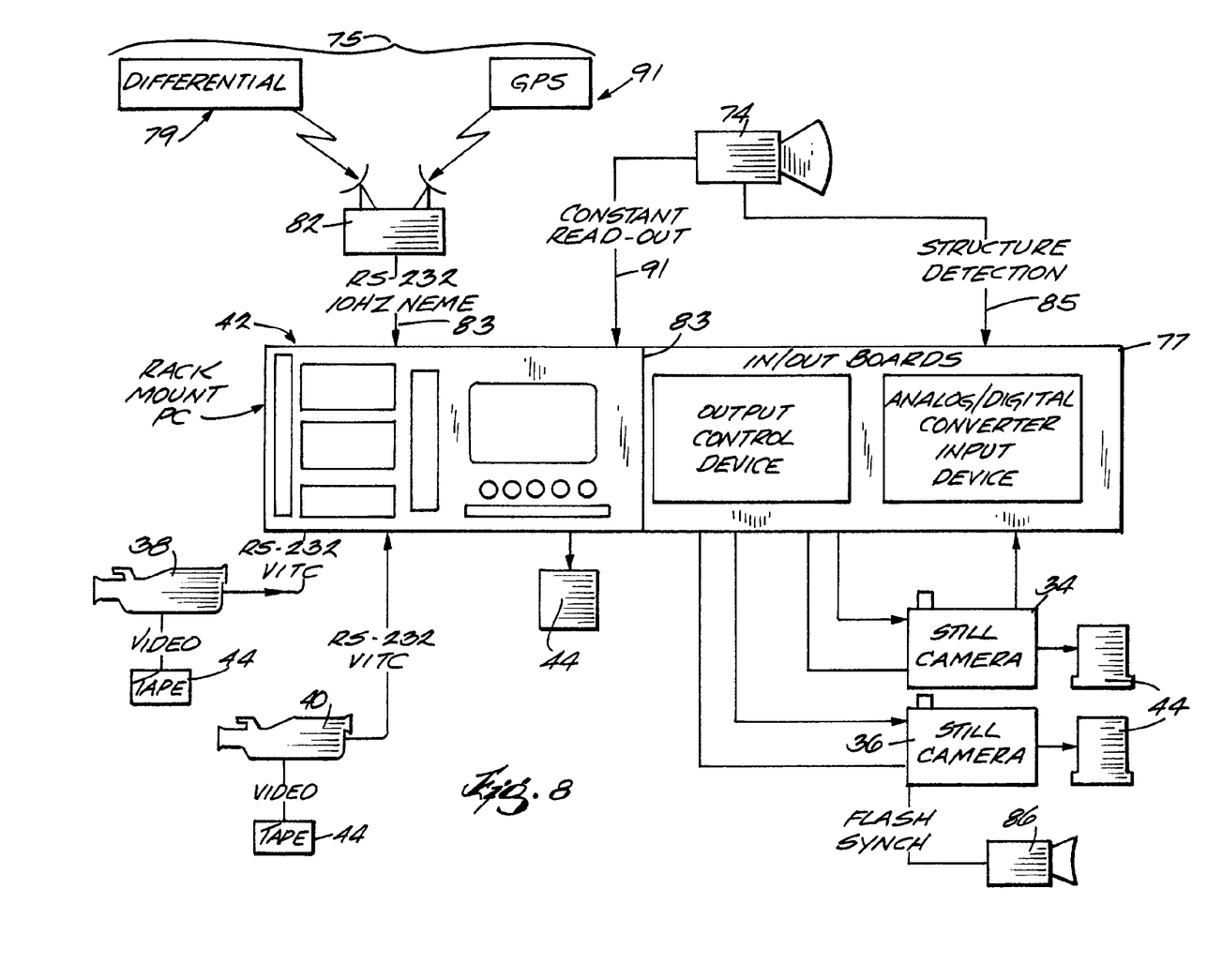
FIG. 8 is diagram illustrating the layout and connections, in schematic fashion, of the operational components of the system.

The cameras provide the image-acquiring portion of the overall system. That system also includes a geographic positioning system (GPS) 72, a mechanism 74 for triggering the still cameras to acquire the images of the tower structure, and related support equipment. The onboard aircraft computer 42 is interconnected with the GPS and trigger system, and also the data storage unit 44 which is also interconnected with the onboard computer. The onboard computer receives and sends out all its required signals via conventional RS-232 ports. The computer is connected to and operatively associated with a multi-relay control and separate in/out interface board 77 that allows it to control various camera functions as well as monitor the equipment's status. Various monitoring devices such as the flat panel displays and/or LCD 46 can be mounted in the aircraft as desired to provide for real time review of the system operation. This equipment and the various connections thereof in the system are conventional and therefore are not shown in the drawings nor described in detail.

The computer and other onboard equipment use aircraft power in a conventional manner.

In the preferred embodiment, the GPS 76, in its preferred form, is a differential system (DGPS) 78 of the type commercially available and referred to as a SATLOK L-Band differentially corrected GPS unit. The use of the DGPS enhances the accuracy of the geographical locating ability of the system. As illustrated, this unit operates off of two satellites 79 and 81 and produces sub-meter accuracy. The data from the GPS is transmitted to the computer via standard NEMA format at 10 Hz frequency, line 83. The differential signal is received by the omni-star system which means that it receives its correction information from satellites 79 and 81. This allows for continental coverage at all times. This unit is also connected to the daylight readable front mounted display 46 that allows the pilot to view signal quality as well as all times without having to look inside the cockpit. The GPS sends real time corrected latitude/longitude readings to the computer and the computer is then able to perform real time coordination of camera tripping and latitude/longitude signals for inventory or survey processing. The GPS unit 76, particularly its antenna, can be supported at a convenient position on the exterior of the aircraft fuselage.

The trigger system 74 in the preferred embodiment is a laser altimeter, a conventional and commercially available device.

The data storage 44 can be in the form of CDs and/or removable hard drives, again interconnected with the onboard computer.

Figure 3:
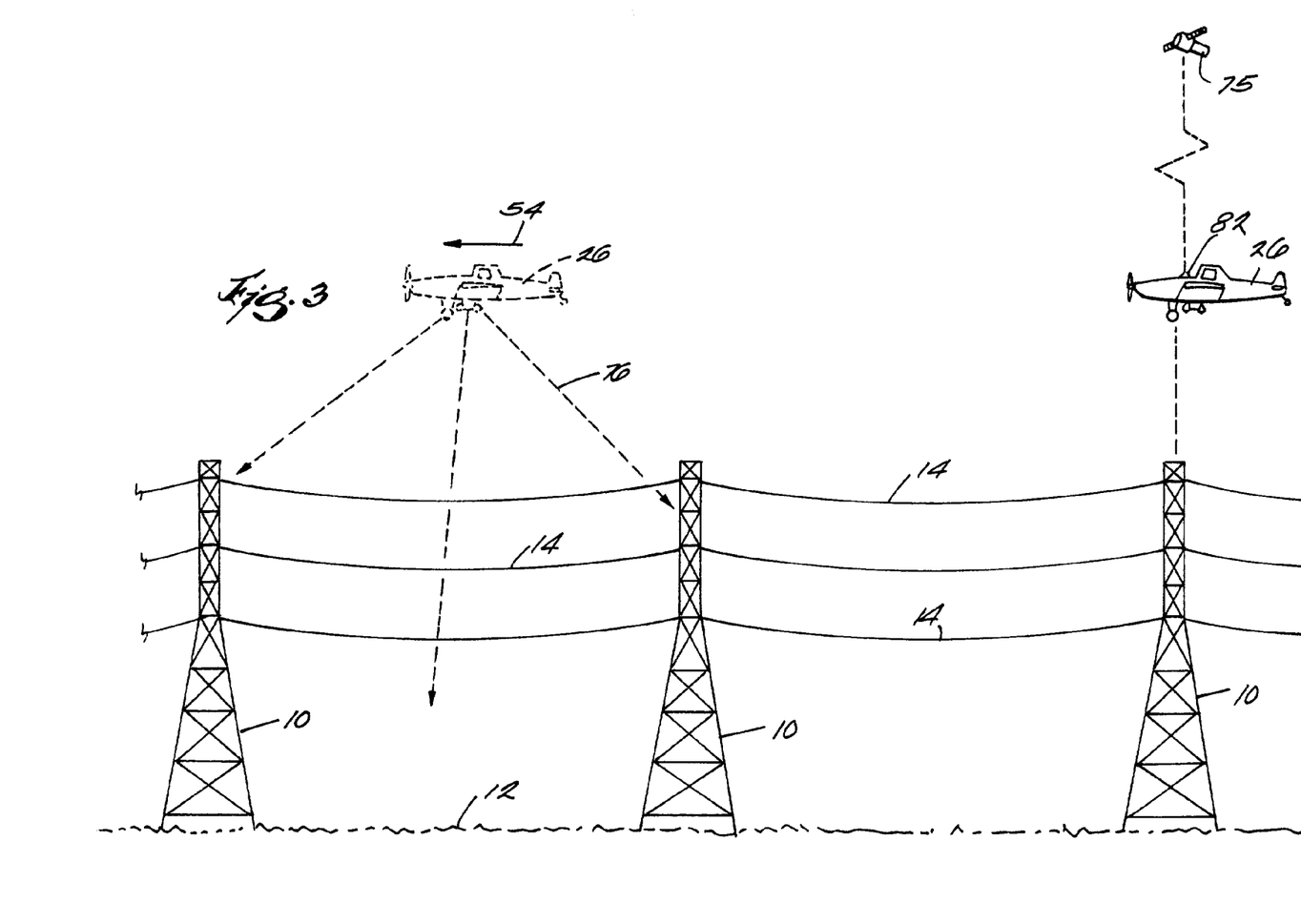
FIG. 3 is a generally schematic, side view of the aircraft of FIG. 2 flying over the transmission line.

Using the line of flight of the aircraft 54 as a base of reference, a reference base which corresponds generally with the longitudinal axis of the aircraft, the still cameras are arranged to take pictures along a line 76 at an angle to the line of flight. That angle is in the range of 30–60 degrees, preferably 45 degrees. Since the aircraft will make its fly over in a horizontal flight altitude, this direction or line of flight will be referred to as horizontal and the angle of the camera orientation will be referred to as being at an angle to the horizontal. It being noted, in that altitude the axis 51 of the aircraft is normally horizontal and the camera exposure angles could also be described in reference to the longitudinal axis of the aircraft.

Continuing, the video camera 40 is arranged at 90 degrees, perpendicular to the horizontal, and takes pictures along a line 78 that is perpendicular to the line of flight. The forward facing video camera 38 is oriented the same as the rearward facing still cameras, i.e., to take pictures along a line 80 at an angle in the range of 30–60 degrees, but preferably 45 degrees.

The laser altimeter 74 can be supported on the outer housing of the pod or, as shown, at a convenient location on the aircraft fuselage 30 and connected in a conventional manner to the on board computer. That connection is illustrated schematically in FIG. 8 as being through the interface board 77 and directly to the computer, interface 83 and line 85 respectively. As is well known, the laser altimeter by projecting a laser beam 87 downwardly to the terrain, is capable of determining the height of the aircraft above the terrain. It can be used to obtain data and artificially reproduce the topography of the terrain 12 along the right-of-way. In the application of this invention, it is used to detect the presence of a tower structure. When the beam 87 is interrupted by a tower structure, the laser altimeter detects the major difference in height of the aircraft above a tower 10 as compared to height of the aircraft above the terrain it had been sensing as the aircraft approached the tower. The laser altimeter generates a signal in response to that difference which is transmitted to the onboard computer establishing the fact that the aircraft has passed over a tower.

In the description which follows, it should be understood that the interaction between the onboard computer and the various pieces of system equipment are all coordinated and rendered operable on the basis of appropriate operating or executable software programs which are a functional part of the onboard computer operation. The actual details of the software programming are not essential to an understanding of this invention and can be achieved with conventional programming techniques. The programming techniques and actual implementation of the software can be created and achieved by one having ordinary skill in that art and therefore will not be disclosed herein.

In general terms, the airborne inspection software is comprised of two setup stages, airborne capture and post processing. The airborne capture software can be considered as being made up of different operational modules that can be run either separately, or together as needed. The modules include a video module, a laser survey module, a GPS camera trip module, and/or laser altimeter trip module.

A video survey module has the computer recording all the GPS data strings as well as all the VITC time code signals from the downward and/or forwardly facing video cameras for filming the right-of-way. These data strings are time stamped with precise times from the computer and the longitude/latitude tower coordinates from the GPS. This information is collected for the entire run and then saved as a single integrated text file for post processing as will be described hereinafter. This provides a database of the right-of-way, all of the towers along the right-of-way, and the longitude/latitude coordinates for each tower.

A laser survey module (i.e., terrain mapping) has the computer recording all the GPS data strings as well as continuous laser readings 91 into a text file. This file also contains the time stamp of the time when the laser altimeter located a transmission tower structure, and in cooperation with the GPS, the longitude/latitude coordinates of each tower the same as was described above in connection with the video survey module.

The GPS is capable of identifying the geographical coordinates for a given tower, longitude/latitude. With the appropriate software programming as mentioned above, the system is capable of embedding the longitude/latitude coordinates for either the video output or the still camera output. That is, the longitude/latitude coordinates will be embedded, pursuant to appropriate operational instructions, in association with the image of a particular tower.

In the GPS camera trip mode (FIG. 9), the GPS camera trip software module requires that the computer be given the latitude/longitude location of every tower that is to be filmed. The computer then steadily calculates the distance from a last GPS reading at 95 the last tower encountered to the first tower location to be encountered after that last tower GPS reading. The program calculates 97, using the aircraft ground speed, the time delay needed to trip 99 the camera after passing the upcoming structure a preselected distance, i.e., arrive at a particular desired exposure point for the still cameras a predetermined distance past the tower. The programming allows for varying the preselected distance, and thus the exposure point, as required or desired. The system is reset 101 with the next trip location being loaded into the computer and the camera trip program starts over again. During the camera trip the computer program records the time and location of the trip into a separate file for post processing of the images.

The laser altimeter trip software module has the computer responding to the input from the laser altimeter signifying the laser altimeter has identified a tower structure. The program then calculates, using the ground speed, to apply the proper time delay to trigger the still cameras at the desired exposure point. Again the program records the time of the trip along with the geographic longitude/latitude coordinates of that tower location.

Figure 9:
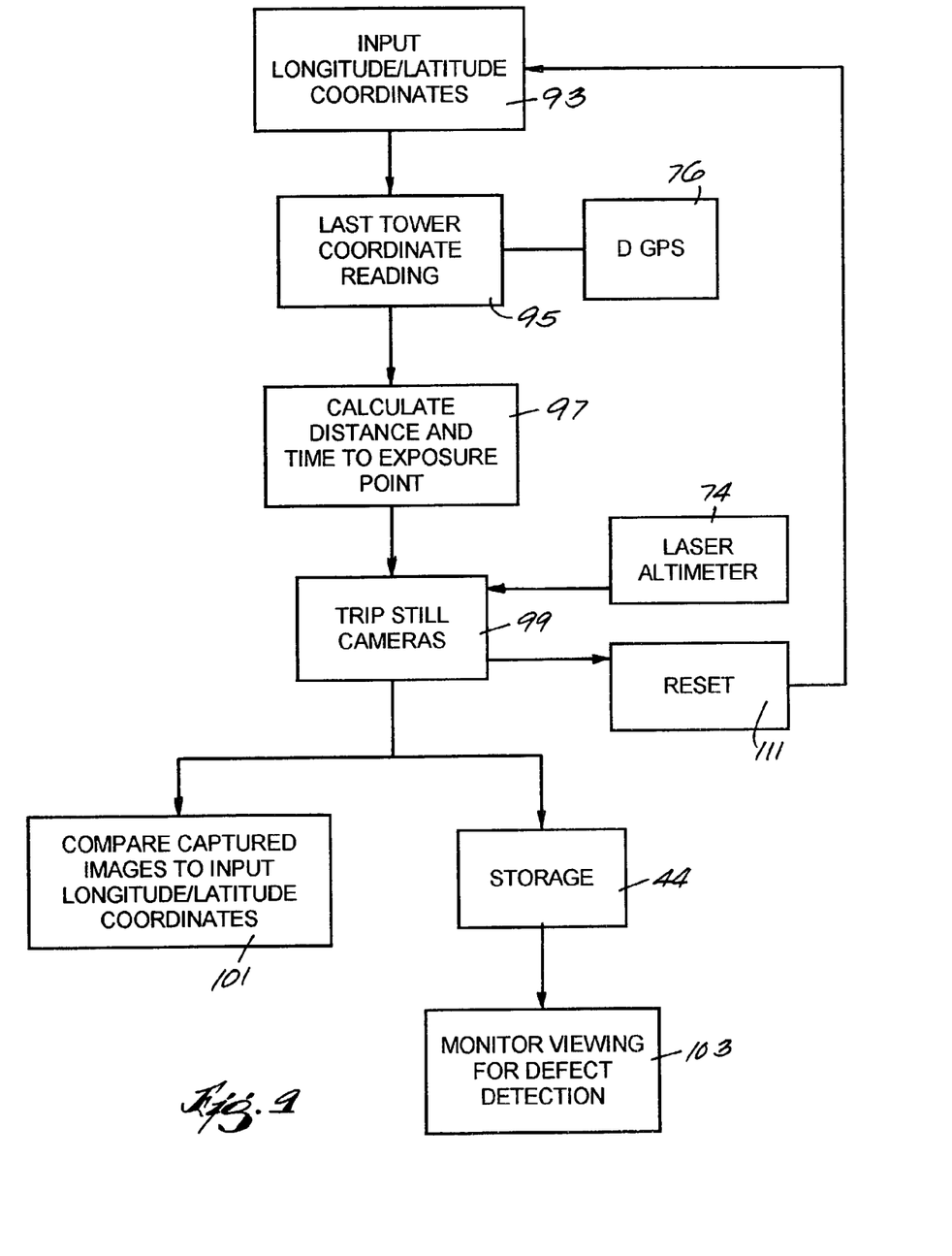
FIG. 9 is a flow diagram of one embodiment.

A post processing software module is provided to perform two separate duties. One is to extract latitude/longitude readings of every tower structure and the other 101 is to coordinate the captured images with the original trip file containing the tower locations and identify any possible missed or extra images and then label all images to predetermined standards, i.e., an AIS (asset inventory system) format.

A videotape based survey module takes the original text file captured by the video cameras and recorded by the computer and applies correction routines to remove minor timing discrepancies. The downward facing video (recording the right-of-way) is then viewed and the VITC time code signal is sent to the post processing computers (not shown) via an RS-232 port. When the videotape is paused, the computer can then calculate the exact location that the aircraft was at during that time and creates an entry in a text file with that location.

An image-labeling program takes the camera trip file created by the airborne computer and compares it to a list of the image files created by each camera for a particular run or fly over. By comparing trip times to camera image creation times the program can verify any missing structures and proceed to properly label the images, to their actual locations.

The laser altimeter beam 87 is directed downwardly, preferably at a right angle to the horizontal, and provides a continuous signal back to the computer of the distance in feet about the terrain. This way, it is also possible to chart the topography of the terrain utilizing the data generated by the laser altimeter.

Figure 10:
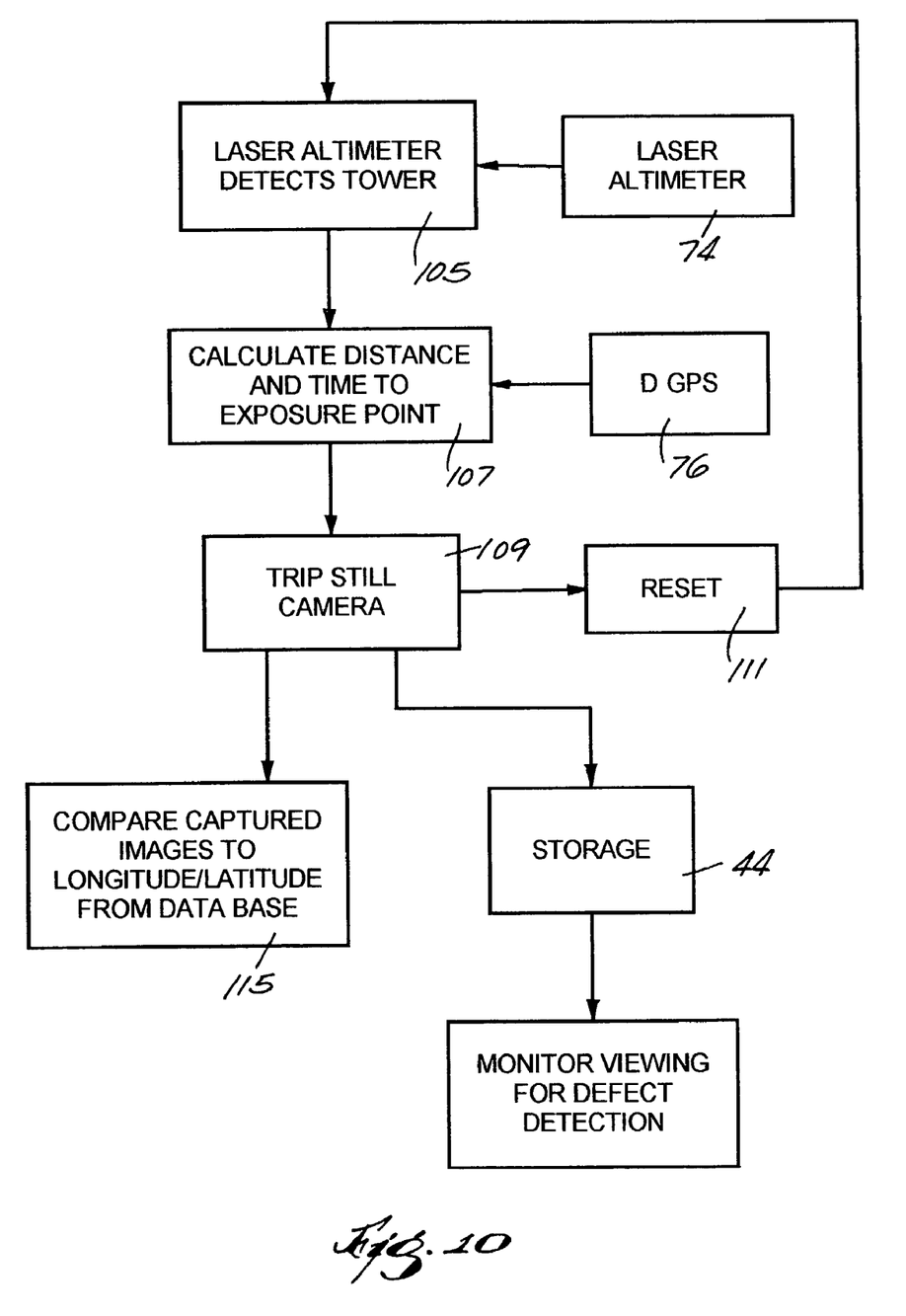
FIG. 10 is a flow diagram of an alternative embodiment.

More particularly and in accordance with the alternative embodiment of this invention and with reference to FIG. 10, the laser altimeter 74 will detect the passage of the aircraft over a tower structure and generate a signal at that point. The signal is used to enable the system to embed the longitude/latitude coordinates of that tower location on the corresponding tower image, either the output from the video or the output from the still cameras, or both. This provides a continuous identification of the geographical location of the towers in the power line.

The signal from the laser altimeter can also be used to enable and trigger the activation of the still camera shutters to produce the still images of the tower structure.

Before describing the overall operation of the inventory and inspection system, it should also be noted that in some instances the transmission line company will already have a database containing the geographic coordinates of all of its tower structures on a particular transmission line. This will be described further in connection with the description of one of the following system embodiments.

In one embodiment, and assuming the objective is to obtain both an inventory of the tower structures and an inspection of the towers and related equipment of a particular transmission line, an initial fly over is executed to provide basic data on the location of the towers. In that operation, the aircraft flies the transmission line with the video cameras operational. As the aircraft passes over a particular tower structure (sensed by the laser altimeter), the longitude/latitude coordinates are identified by the GPS and embedded in the imaging database in association with that particular tower structure. The system is also capable of assigning an inventory number to that tower structure. This is done for the entire transmission line being processed. This initial step would be utilized where the transmission line company does not already have established inventory database of the location of its towers. If the transmission line company has an established inventory database of its tower locations, by longitude/latitude, the initial fly over step is eliminated and the data on tower location is inputted from that database.

The actual inspection fly over is then done by first inputting 93 (FIG. 9) the inventory information obtained as described above into the computer system. The tower location comes from either the first fly over described above or from the transmission line company's own available database.

In this embodiment, the inspection system utilizes the inputted geographic coordinates to arm and trigger the still cameras. More particularly, the GPS 76 constantly monitors the location of the aircraft relative to the tower structure geographical database. When the system detects that it has flown over a particular tower structure, that being accomplished when the detected longitude/latitude coordinates correspond to the inputted database longitude/latitude coordinates 95 (FIG. 9), the computer system is advised that the next tower will be available at a particular upcoming set of longitude/latitude coordinates. The computer then calculates 97 (FIG. 9), based on the ground speed of the aircraft, the time necessary to close the distance to the approaching tower and fly past the tower to a preselected point (the exposure point), measured in feet from the tower at which point the still cameras are activated to record the images 99 (FIG. 9). The system is reset 111 for the next tower to be photographed.

In another embodiment, the physical detection of the presence of the tower structure is sensed and the system is enabled on that basis 105 (FIG. 10). That is, the laser altimeter is continually sensing the profile of the terrain with its downwardly directed beam. As the aircraft passes over the tower structure it detects a major difference in distance from the aircraft to the top of the tower structure as compared to the distance from the aircraft to the terrain. That signal is transmitted to the computer system which then accomplishes a calculation 107 (FIG. 10) based on ground speed to enable and trigger the camera shutters 109 (FIG. 10) at a preselected distance past the tower structure. The system is reset 111 for the next tower to be photographed.

The second embodiment wherein the cameras are enabled to trigger based on actual detection of the presence of the tower structure is preferred as it is more consistent and reliable in operation.

Whichever mode of operation is used, the imaging data acquired is transmitted to the suitable storage media 44, for example, CDs or removable hard drives, for later downloading. This downloading can be for one of two purposes. In the instance of archiving the location of the tower structures it would be to establish the basic database for the transmission line company. In another mode, it would be downloaded and compared with the already existing database for the location of the tower structures to identify any tower structures that may have been missed in the fly over 101 (FIG. 9).

The data acquired by the still cameras would be downloaded for viewing on monitors to make a visual inspection of the tower structures, the hardware and insulators at the tower structures, as well as the transmission cables and the condition of the transmission cables at the tower structures. From that viewing a report can be prepared showing the type and tower location of any detected defects.

In the preferred embodiment, the digital still cameras can be oriented such that they would both take a landscape type photograph or one would capture a landscape photograph whereas the other camera would produce a portrait photograph.

The exposure point for the still cameras is illustrated by the dotted line showing of the aircraft in FIG. 3. The exposure point is horizontally between two adjacent towers 10 and the still cameras are photographing the trailing tower, i.e., trailing relative to direction of flight of the aircraft. The still photographs are taken along a line which is 30–60 degrees to the horizontal, preferably 45 degrees. Those parameters of location of the exposure point and the line of camera exposure place the cameras in close proximity to the tower being photographed to achieve high-resolution imagery for later defection investigation.

Specifically, by flying 80–100 feet above the tower structures the ability to capture the tower structure in high resolution is greatly enhanced.

Also, being that close to the tower structures means that slight deviations of the aircraft either vertically or horizontally from the intended line of flight are not exaggerated in composition of the pictures being taken, i.e., the tower structure can still be adequately framed even with those vertical and horizontal deviations. That should be compared to an aircraft flying at greater heights of, for example, 1500–6000 feet where aircraft movement in inches or feet can result in missing all or part of the tower structure.

Flying at a speed in the range of 80–100 miles per hour also provides a relatively rapid traverse of the power lines while at a speed that permits accurate image capture of the tower structure and the attendant electrical and mechanical hardware in a cost effective manner.

A conventional 800-watt/second Lumedyne brand flash system is installed on the aircraft and includes two externally mounted light units 86 on the wings (only one shown in the drawings). The role of this flash is to reduce daytime shadows (flash fill) or for full lighting during times of low light levels. As the digital still images of the towers are captured at close proximity to the cameras (50–100 ft) a high powered flash is now capable of being highly effective in improving the image capture. The flash system is fired directly from the still cameras, the DCS-Kodak camera flash synch connectors, and uses the standard flash system wiring.

Although specific embodiments of this invention have been illustrated and described, it will be apparent to those skilled in the art that various changes and modifications may be made therein without departing from the spirit of the invention or from the scope of the appended claims.

We claim:

1. A system for acquiring images of electric transmission line tower structures, equipment attached to said tower structures, and transmission lines suspended from said system utilizing an aircraft and an arrangement of at least one still camera, means for detecting a tower structure, a data storage unit, and a central processing unit containing operational software and connected to said cameras, said means for detecting a tower structure, and said storage unit, said system comprising the steps of:

a, flying said aircraft along the transmission line at a predetermined altitude above the tops of the towers, said aircraft having a line of flight along said transmission line and generally parallel to the horizontal defined by the terrain over which said aircraft is flying,     b, arranging said camera to point rearwardly relative to said line of flight and to take pictures along an exposure line directed downwardly at an angle of less than 90 degrees to said horizontal,     c, generating and transmitting a signal to said central processing indicative of the presence of a tower to be photographed,     d, determining in said central processing unit the time delay necessary for said aircraft to fly past said tower to a predetermined exposure point located between the tower to be photographed and the next tower in said transmission line after the tower to be photographed,     e, activating said still camera at said exposure point to acquire an image of said tower structure,     f, transmitting the data corresponding to said acquired image to said data storage unit, and     g, resetting said system to repeat steps c, d, e, and f for the next tower in said transmission line.

2. The system of claim 1 wherein said still camera is a digital camera.

3. The system of claim 2 including a GPS unit connected to said central processing unit and wherein said detecting means compromises     inputting longitude/latitude coordinates for the towers to be imaged into said central processing unit, and said detecting means further including     generating a signal when the longitude/latitude coordinates of a tower passed by said aircraft correspond to a set of longitude/latitude coordinates for a tower previously input to said central processing unit,     determining the location of the next tower in the line of flight of the aircraft from said previously input longitude/latitude coordinates, and calculating the time necessary for the aircraft to cover the distance from the location of the aircraft where the signal was received to the point of exposure beyond said next tower.

4. The system of claim 2 including a GPS unit connected to said central processing unit, said GPS generating continuous signals of the longitude/latitude coordinates of the position of said aircraft along said transmission line and transmitting said coordinates to said central processing unit and said central processing unit embedding the coordinates for a tower which image has been captured in association with the data for the image of that tower so that when the image of said tower is retrieved from storage the coordinates of that tower are also reproduced on the image.

5. The system of claim 4 wherein said GPS is also interconnected with said video camera and said longitude/latitude coordinates are also embedded in association with the respective tower images on said video record.

6. The system of claim 2 including the step of retrieving the image data captured by said still camera and examining said images to detect defects in said towers, equipment supported on said on said towers and said transmission lines.

7. The system of claim 6 including two still cameras and both cameras are activated to capture images of said towers.

8. The system of claim 1 wherein said aircraft is flown at an altitude of 60–100 feet over the tops of said towers.

9. The system of claim 1 wherein said aircraft is flown over said transmission lines at a speed of 80–100 miles per hour.

10. The system of claim 1 wherein said exposure line along which said camera takes pictures is directed downwardly at an angle in the range of 30–60 degrees.

11. The system of claim 10 wherein said angle is 45 degrees.

12. The system of claim 1 which also includes at least one video camera and wherein said video camera is directed downwardly toward the transmission lines, and said system includes filming the right-of-way of said transmission line using said video camera, and transmitting the images captured by said video camera to said storage unit.

13. The system of 12 including the step of displaying the images from said video camera in the area of the cockpit of said aircraft for viewing by the pilot.

14. A system for acquiring images of electric transmission line tower structures and equipment attached to said tower structures, said system utilizing an aircraft and an arrangement of at least one digital still camera, means for detecting a tower structure, a data storage unit, and a central processing unit containing operational software and connected to said cameras, said means for detecting a tower structure, and said storage unit, said system comprising the steps of:

a, flying said aircraft along said transmission line at an altitude of 60–100 feet above the tops of the towers, said aircraft having a line of flight along said transmission line and generally parallel to the horizontal defined by the terrain over which said aircraft is flying, b, arranging said camera to point rearwardly relative to said line of flight and to take pictures along a line directed downwardly at an angle of less than 90 degrees to said horizontal, c, generating and transmitting a signal to said central processing indicative of the presence of a tower to be photographed, d, determining in said central processing unit the time delay necessary for said aircraft to fly past said tower to a predetermined exposure point located between the tower to be photographed and the next tower in said transmission line after the tower to be photographed, e, activating said still camera at said exposure point to acquire an image of said tower structure, f, transmitting the data corresponding to said acquired image to a data storage unit, and g, resetting said system to repeat steps c, d, e, and f for the next tower in said transmission line.

15. The system of claim 14 including retrieving the data relating to said still images form said storage and displaying said images for visual inspection of said tower and related equipment for defects.

16. The system of claim 14 wherein said aircraft is flown over said transmission lines at a speed of 80–100 miles per hour.

17. The system of claim 14 wherein said line along which said camera takes pictures is directed downwardly at an angle in the range of 30–60 degrees.

18. The system of claim 14 wherein said angle is 45 degrees.

19. The system of claim 14 which also includes at least one video camera and wherein said video camera is directed downwardly toward the transmission lines, and system including filming the right-of-way of said transmission line using said video camera and transmitting the data corresponding to the images captured by said video camera to said storage unit.

20. The system of claim 19 including a GPS unit connected to said central processing unit, said GPS generating continuous signals of the longitude/latitude coordinates of the position of said aircraft along said transmission line and transmitting said coordinates to said central processing unit and said central processing unit embedding the coordinates for a tower which image has been captured in association with the data for the image of that tower captured by said video camera so that when the image of said tower is retrieved from storage the coordinates of that tower are also reproduced on the image.

21. The system of claim 14 including a GPS unit connected to said central processing unit and wherein said detecting means compromises inputting longitude/latitude coordinates for the towers to be imaged into said central processing unit, and said detecting means further including generating a signal when the longitude/latitude coordinates of a tower passed by said aircraft correspond to a set of longitude/latitude coordinates for a tower previously input to said central processing unit, determining the location of the next tower in the line of flight of the aircraft from said previously input longitude/latitude coordinates, and calculating the time necessary for the aircraft to cover the distance from the location of the aircraft where the signal was received to the point of exposure beyond said next tower.

22. The system of claim 14 including a GPS unit connected to said central processing unit, said GPS generating continuous signals of the longitude/latitude coordinates of the position of said aircraft along said transmission line and transmitting said coordinates to said central processing unit and said central processing unit embedding the coordinates for a tower which image has been captured in association with the data for the image of that tower captured by said still camera so that when the image of said tower is retrieved from storage the coordinates of that tower are also reproduced on the image.

23. A system for acquiring images of electric transmission line tower structures and equipment attached to said tower structures, said system utilizing an aircraft and an arrangement of at still cameras, a GPS unit, a device for detecting a tower structure, and a central processing unit containing operational software and connected to said cameras, and tower detecting device, said system comprising:
  a, flying said aircraft along said transmission line at a speed of 80–100 miles per hour and at an altitude of 80–100 feet above the tops of said tower structures,
  b, detecting the presence of a tower structure,
  c, generating a signal in said detecting device when said tower is detected corresponding to the relative position of said aircraft and said tower structure and transmitting that signal to said central processing unit,
  d, said central processing unit determining a distance from said point of detection to a preselected point relative to said detected tower structure and the time necessary for the aircraft to traverse that determined distance,
  e, transmitting a signal from said central processing unit to said still cameras to activate said still cameras and trigger the shutters thereof when said aircraft has reached said preselected point,
  f, transmitting the data corresponding to the images captured by said still camera to a data storage unit, and
  g, resetting said system to repeat steps c, d, e, and f for the next tower in said transmission line.

24. The system of claim 23 wherein said aircraft has a line of flight generally parallel to the terrain over which said aircraft is flying and wherein said still cameras are arranged to take a picture along a line which is at an angle of substantially 30–60 degrees to said line of flight.

25. The system of claim 23 wherein said angle is 45 degrees.

26. The system of claim 23 including a video camera and wherein said video camera is arranged to take pictures along a line which is at an angle of substantially 90 degrees to said line of flight and directed downwardly relative to said line of flight.

27. The system of claim 23 wherein said aircraft is flown at a speed of 80–100 miles per hour.

28. The system of claim 23 wherein said aircraft is flown at a speed of 80–100 miles per hour.

29. The system of claim 23 including a GPS unit connected to said central processing unit and generating longitude/latitude coordinates for the tower structures as they are photographed by said still camera, and embedding the longitude/latitude coordinates for the towers in association with the image data for a respective tower so that when the data relating to the image of a particular tower is retrieved the longitude/latitude coordinates for that tower are retrieved along with it.

30. The system of claim 29 including a video camera arranged to take pictures along a line which is at an angle of substantially 90 degrees to said line of flight and directed downwardly relative to said line of flight and wherein said central processing unit embeds the longitude/latitude coordinates for the towers in association with respective towers so that when the data relating to the image of a particular tower is retrieved the longitude/latitude coordinates for that tower are retrieved along with the images.

31. Apparatus for acquiring images of the towers of an electric transmission line, equipment on said towers, and the transmission lines suspended from said towers and comprising, in combination,
  an aircraft,
  a data collection pod connected to the underside of said aircraft, said data collection pod including:
    a housing attached to said fuselage,
    a digital still camera supported in said housing,
    an open ended channel in said housing extending rearwardly relative to line of flight of said aircraft and at an angle to the longitudinal axis of said aircraft,
  said still camera arranged to take pictures through said open ended channel,
  a central processing unit on said aircraft and connected to said still camera,
  a data storage unit connected to said central processing unit,
  means for detecting the presence of a tower along said transmission line and connected to and sending a signal to said central processing unit when a tower is detected, and
  said central processing unit determining the time necessary for said aircraft to fly from said point at which said signal is received from said detecting means to an exposure point past said detected tower and before the next tower in said transmission line and operating said still camera at said exposure point to capture an image of said detected tower,
  and means for transmitting the data corresponding to the image of said tower to a data storage unit.

32. The apparatus of claim 31 wherein said angle of said channel and the exposure line of said camera is 30–90 degrees to the longitudinal axis of said aircraft.

33. The apparatus of claim 32 wherein said angle is 45 degrees.

34. The apparatus of claim 31 including a GPS unit connected to said central processing unit and providing continuous longitude/latitude coordinates of said aircraft to said central processing unit.

35. The apparatus of claim 31 wherein said detecting means is a combination of longitude/latitude coordinates of the respective location of the towers in said transmission line, the continuous longitude/latitude coordinates transmitted by said GPS unit, and means for comparing said first longitude/latitude coordinates to said continuously generated longitude/latitude coordinates to determine when a tower is present.

36. The apparatus of claim 31 including a video camera supported in said housing and directed downwardly from said aircraft to film the towers and terrain over which said aircraft is flying.

37. The apparatus of claim 31 including a first video camera supported in said housing and directed downwardly from said aircraft to film the towers and terrain over which said aircraft is flying and a second video camera supported in said housing and directed forwardly relative to line of flight of said aircraft and downwardly at an angle to the longitudinal axis of said aircraft, both of said video camera operative to film the towers and the terrain over which said aircraft is flying.

38. The apparatus of claim 31 including a display in the area of the cockpit of said aircraft for displaying the images being captured by one of said video cameras to the pilot of said aircraft.

* * * * *